(12) United States Patent
Chen et al.

(10) Patent No.: US 8,054,556 B2
(45) Date of Patent: Nov. 8, 2011

(54) LENS

(75) Inventors: Sung-Nan Chen, Hsinchu (TW);
Long-Sheng Liao, Hsinchu (TW);
Ya-Ling Hsu, Hsinchu (TW);
Chao-Shun Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 78 days.

(21) Appl. No.: 12/610,598

(22) Filed: Nov. 2, 2009

(65) Prior Publication Data

US 2010/0232039 A1    Sep. 16, 2010

Related U.S. Application Data

(60) Provisional application No. 61/202,575, filed on Mar. 13, 2009.

(30) Foreign Application Priority Data

Jun. 29, 2009  (TW) .............................. 98121851 A

(51) Int. Cl.
G02B 9/00        (2006.01)
G02B 9/64        (2006.01)
G02B 17/00       (2006.01)

(52) U.S. Cl. ..................... 359/649; 359/754; 359/728

(58) Field of Classification Search .......... 359/648–651, 359/708–718, 728, 754–755, 793–795, 662; 348/240.99–240.3; 396/72–88
See application file for complete search history.

(56) References Cited

U.S. PATENT DOCUMENTS

| 6,520,646 | B2* | 2/2003 | Rodriguez et al. .............. 353/69 |
| 7,048,388 | B2 | 5/2006 | Takaura et al. |
| 7,123,420 | B2 | 10/2006 | Matsuo |
| 7,441,908 | B2 | 10/2008 | Takaura et al. |
| 2007/0184368 | A1 | 8/2007 | Nishikawa et al. |
| 2008/0079915 | A1 | 4/2008 | Amano et al. |
| 2008/0192208 | A1 | 8/2008 | Benoit et al. |
| 2009/0091846 | A1* | 4/2009 | Chou ........................... 359/716 |

FOREIGN PATENT DOCUMENTS

| TW | I289210 | 11/2007 |
| TW | 200839411 | 10/2008 |

OTHER PUBLICATIONS

Klein, Miles V., and Thomas E. Furtak. Optics. New York: Wiley, 1986. p. 164-171, 193-197. Print.*

* cited by examiner

*Primary Examiner* — Ricky Mack
*Assistant Examiner* — Zachary Wilkes
(74) *Attorney, Agent, or Firm* — J.C. Patents

(57) ABSTRACT

A lens adapted to image a first image plane at a reduced side onto a magnified side is provided. The lens has an optical axis. The lens includes a lens group and a concave reflective mirror. The lens group is disposed in the light path between the reduced side and the magnified side. The concave reflective mirror is disposed in the light path between the lens group and the magnified side. The offset of the first image plane with respect to the optical axis is greater than 100%. The throw ratio of the lens is less than 0.3.

16 Claims, 10 Drawing Sheets

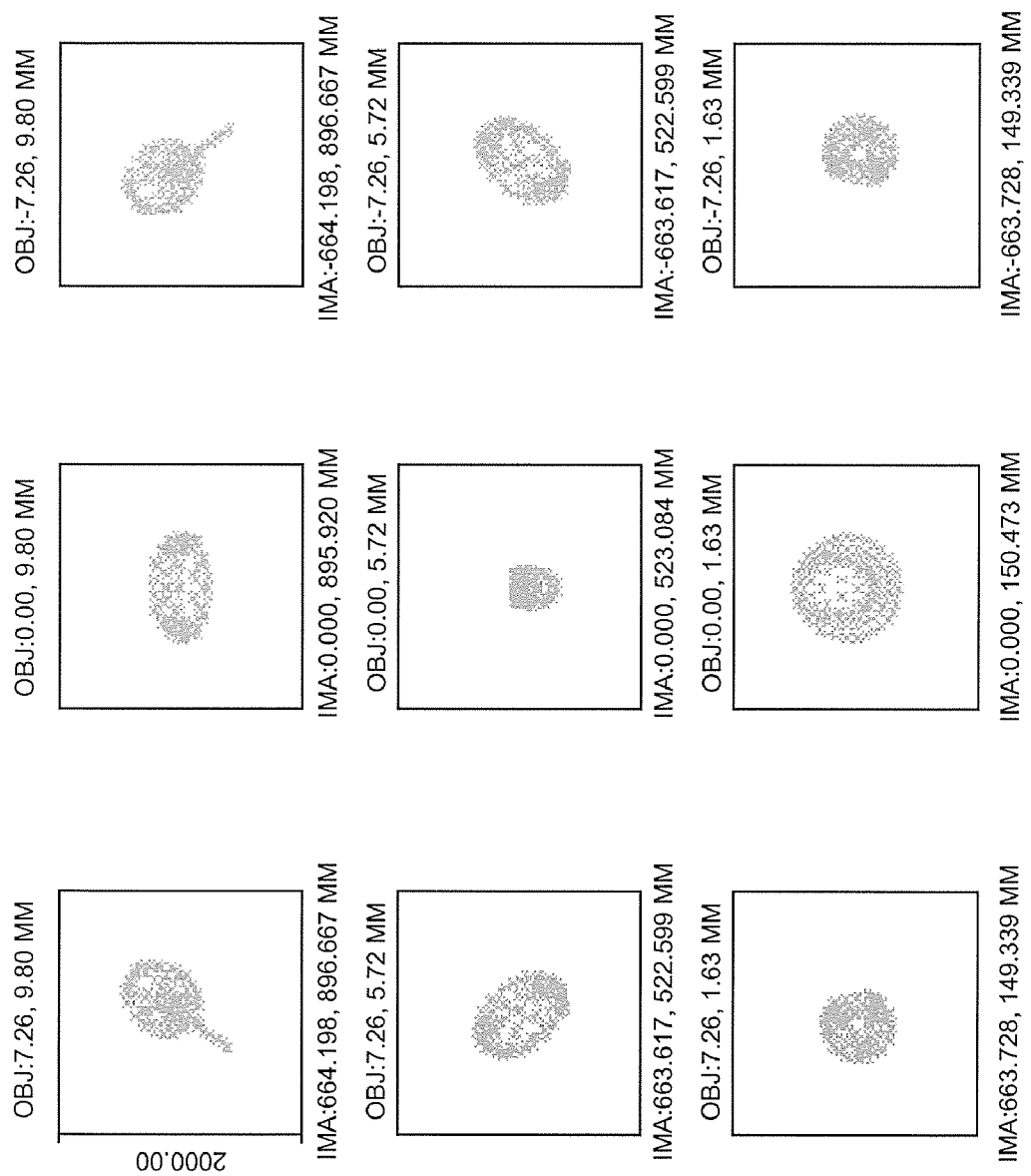

_LENS_

CROSS-REFERENCE TO RELATED
APPLICATION

This application claims the priority benefit of U.S.A. provisional application Ser. No. 61/202,575, filed on Mar. 13, 2009, all disclosures are incorporated therewith. This application also claims the priority of Taiwan application serial no. 98121851, filed Jun. 29, 2009. All disclosure of the Taiwan application is incorporated herein by reference.

BACKGROUND OF THE INVENTION

1. Field of the Invention

The invention generally relates to a lens and more particularly, the invention relates to a projection lens.

2. Description of Related Art

Due to advancements in display technologies, a new generation of displays such as the liquid crystal display (LCD), the plasma display panel (PDP), and the projection apparatus have gradually replaced the traditional cathode ray tube (CRT). Among these, the LCD, the PDP and other panel displays have shared a large percentage in residential market because of their lower thickness. On the other hand, the projection apparatus has maintained a stable market share because of its ability to provide a very large image (i.e. over 52 inches) at a comparatively low cost. Furthermore, the expansive display provided by the projection apparatus makes group viewings enjoyable, and therefore a major reason why the projection apparatus has been irreplaceable is its applications in conference meetings, report presentations, and lectures. In recent years, the projection apparatus has also become an indispensable part of the home theater.

In the projection apparatus, images presented on the light valve are small, defined images. Some examples of the light valve include the liquid-crystal-on-silicon panel (LCOS panel) or the digital micro-mirror device (DMD). A projection lens is used to project small images on the light valve onto the viewing screen to form magnified images. Additionally, in order to project larger images within a shorter distance, some conventional techniques use lenses having curved reflective mirrors in front.

Curved reflective mirrors may be categorized into convex reflective mirrors and concave reflective mirrors, wherein convex reflective mirrors usually have a larger size so that dust protecting is difficult to design for the lenses. Lenses having concave reflective mirrors in front have been disclosed in disclosures such as U.S. Patent Application Publication Nos. 20070184368 (also Taiwan Patent No. 1289210), 20080079915, and 20080192208, as well as U.S. Pat. Nos. 7,048,388, 7,441,908, and 7,123,420. Among these disclosures, U.S. Application Publication Nos. 20070184368 and 20080192208, along with U.S. Pat. Nos. 7,048,388 and 7,441,908 have suggested forming intermediate images between the lens groups and the concave projection lenses.

SUMMARY OF THE INVENTION

Accordingly, the invention provides a lens having a substantially smaller throw ratio and capable of projecting a substantially larger image within a substantially shorter distance.

Other objects and advantages of the invention may be further understood by referring to the technical features broadly embodied and described as follows.

In order to achieve one or a part of or all of the aforementioned advantages or other advantages, an embodiment of the invention provides a lens adapted to image a first image plane at a reduced side onto a magnified side, and the lens has an optical axis. The lens includes a lens group and a concave reflective mirror. The lens group is disposed in a light path between the reduced side and the magnified side, and the concave reflective mirror is disposed in the light path between the lens group and the magnified side. An offset of a first image plane with respect to the optical axis is greater than 100%. The throw ratio of the lens is less than 0.3. The first image plane includes an image point A, an image point B, an image point C, an image point D, an image point E, an image point F, an image point G, an image point H, and an image point I. The first image plane includes a first side, a second side opposite to the first side, a third side connected with the first side and the second side, and a fourth side opposite to the third side, wherein the fourth side is connected with the first side and the second side. The image point A is disposed on an apex connecting the first side and the third side, the image point C is disposed on an apex connecting the first side and the fourth side, the image point G is disposed on an apex connecting the third side and the second side, the image point I is disposed on an apex connecting the fourth side and the second side, the image point B is disposed on a midpoint between the image point A and the image point C, the image point D is disposed on a midpoint between the image point A and the image point G, the image point F is disposed on a midpoint between the image point C and the image point I, the image point H is disposed on a midpoint between the image point G and the image point I, the image point E is disposed on a midpoint between the image point B and the image point H, and the image point E is also disposed on a midpoint between the image point D and the image point F. A reference plane is disposed on a midpoint of a distance between the lens group and the concave reflective mirror, and the reference plane is perpendicular to the optical axis. A center ray between a plurality of marginal rays emitted from each of the image points A, B, C, D, E, F, G, H, and I is adapted to intersect the reference plane, and the center rays respectively emitted from each of the image points A, B, C, D, E, F, G, H, and I are adapted to respectively intersect the reference plane at a reference point a, a reference point b, a reference point c, a reference point d, a reference point e, a reference point f, a reference point g, a reference point h, and a reference point i. The lens is disposed in a space defined by a coordinate system constructed by a x-axis, a y-axis, and z-axis, wherein the optical axis and the z-axis overlap each other, the x-axis is parallel to the third side and the fourth side, the y-axis is parallel to the first side and the second side, and the x, y, and z axes are perpendicular to each other. The distances respectively kept by the reference points g, d, a, h, e, and b from an y-z plane are respectively D1, D2, D3, D4, D5, and D6, wherein $1<D4/D1<1.5$, $1<D5/D2<1.5$, and $1<D6/D3<1.5$.

The lens according to embodiments of the invention satisfies the aforementioned relation (i.e. $1<D4/D1<1.5$, $1<D5/D2<1.5$, and $1<D6/D3<1.5$) and has a smaller throw ratio, such that the lens may project a larger image within a shorter distance, and the optical image quality of the image is good.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated

FIG. 7 is a diagram illustrating the simulated data of the imaging optics in the lens depicted in FIG. 6A.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
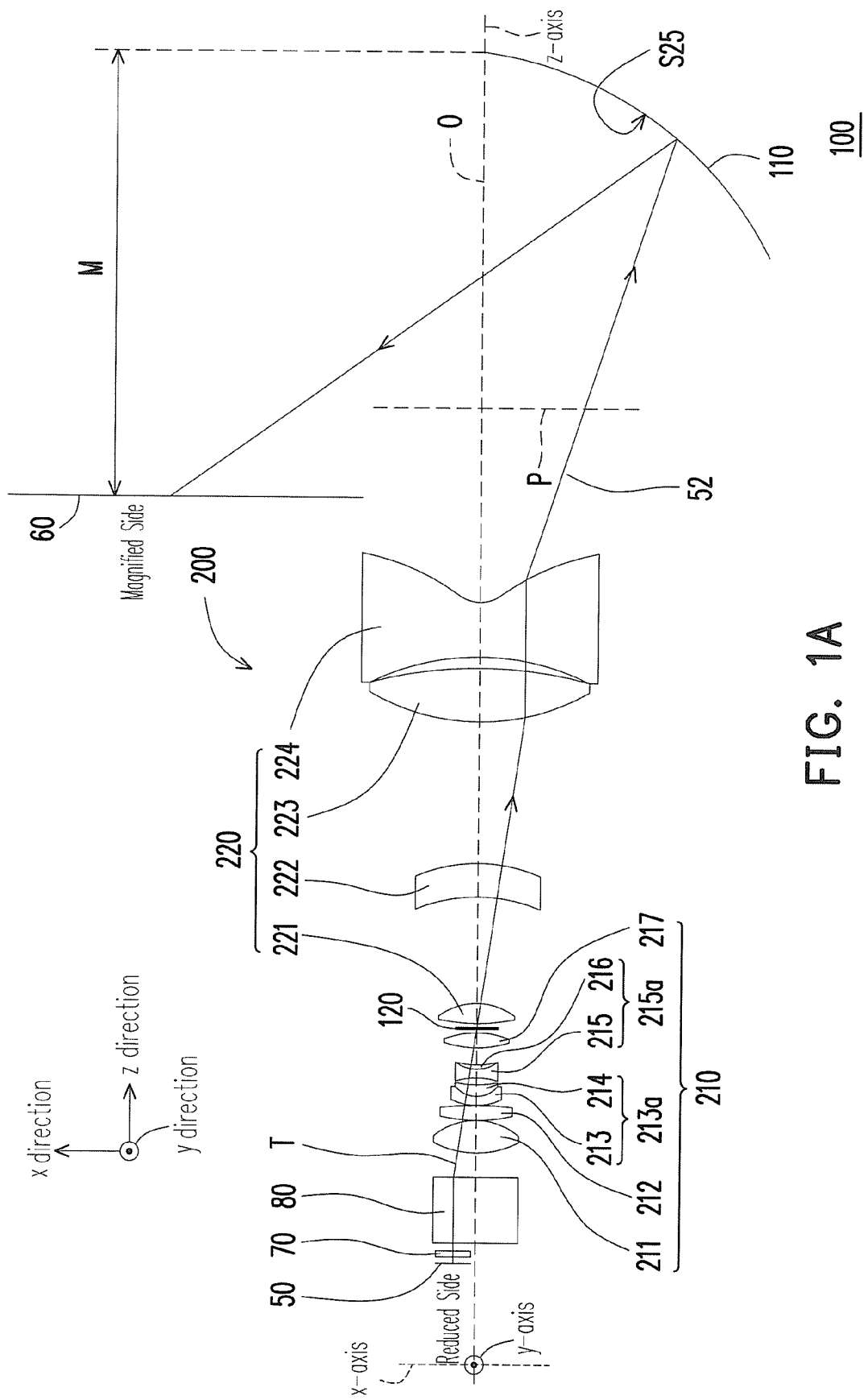
FIG. 1A is a schematic diagram illustrating the structure of a lens in accordance with one embodiment of the present invention.
Figure 1B:
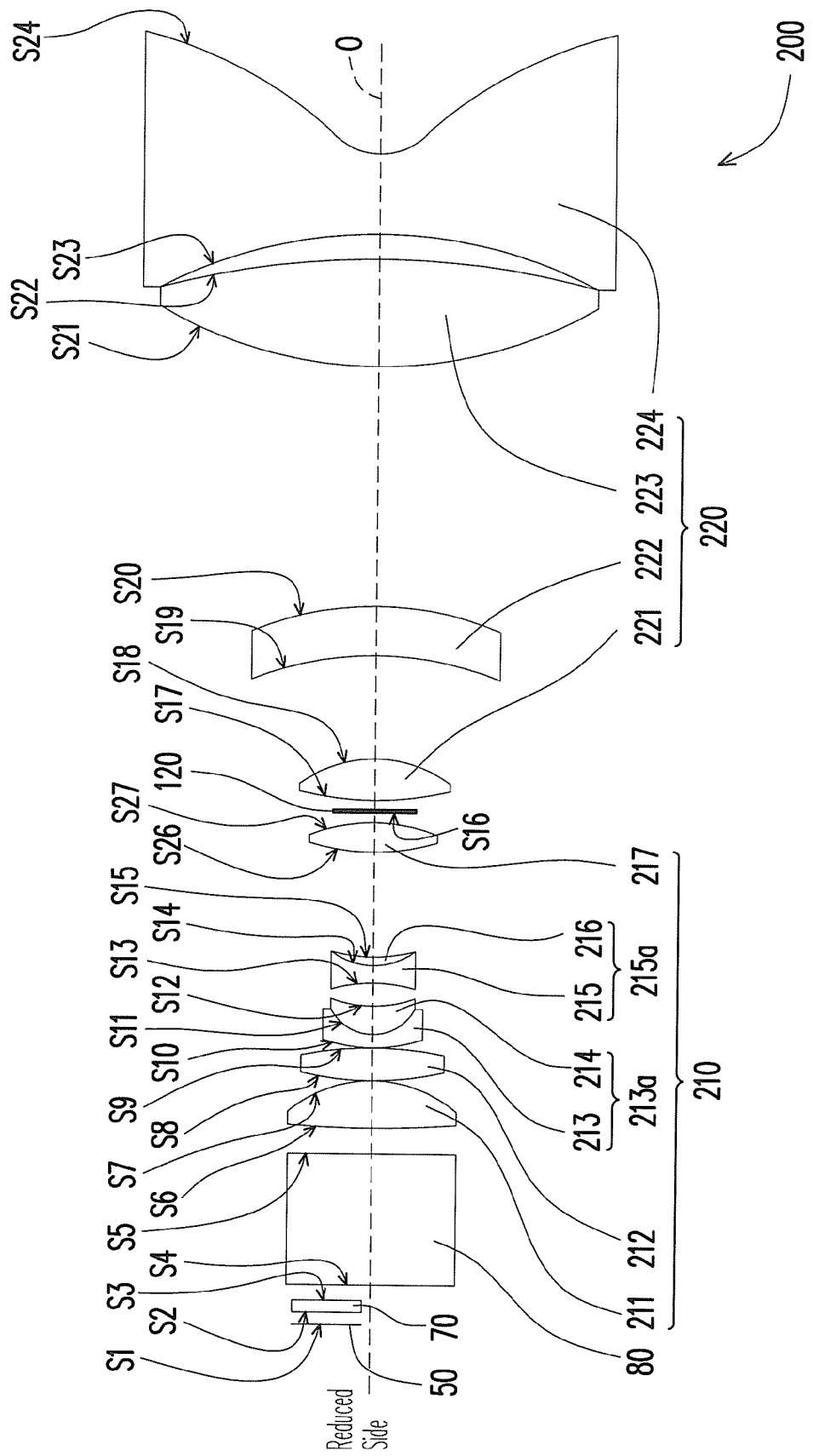
FIG. 1B is a schematic diagram illustrating the structure of a lens group in the lens depicted in FIG. 1A.

Referring to FIGS. 1A and 1B, in the embodiment of the invention, lens 100 is adapted to image a first image plane 50 at a reduced side onto a magnified side. In the embodiment of the invention, lens 100 may be a fixed focus lens. In the embodiment of the invention, the first image plane 50 may be an active area of a light valve, for example, and the image beam 52 emitted from the first image plane 50 is adapted to be projected by lens 100 onto a screen 60 at the magnified side to form an image. An example of the light valve may be the digital micro-mirror device (DMD). However, in other embodiments of the invention, the light valve may also be a liquid-crystal-on-silicon panel (LCOS panel) or a transmissive liquid crystal panel. Lens 100 has an optical axis O. Lens 100 may be disposed in a space defined by a coordinate system constructed by an x-axis, a y-axis, and z-axis, wherein the optical axis O and the z-axis overlap each other, and the x, y, and z axes are perpendicular to each other.

The lens 100 includes a lens group 200 and a concave reflective mirror 110. The lens group 200 is disposed in a light path between the reduced side and the magnified side, and the concave reflective mirror 110 is disposed in the light path between the lens group 200 and the magnified side. In the embodiment of the invention, the lens group 200 includes a first sub-lens group 210 and a second sub-lens group 220. The first sub-lens group 210 is disposed in the light path between the reduced side and the concave reflective mirror 110. The first sub-lens group includes a first lens 211, a second lens 212, a third lens 213, a fourth lens 214, a fifth lens 215, and a sixth lens 216 in sequence from the reduced side to the magnified side, wherein the first lens 211 has a positive refractive power, the second lens 212 has a positive refractive power, the third 213 lens has a negative refractive power, the fourth lens 214 has a positive refractive power, the fifth lens 215 has a negative refractive power, and the sixth lens 216 has a positive refractive power The second sub-lens group 220 is disposed in the light path between the first sub-lens group 210 and the concave reflective mirror 110. The second sub-lens group includes a seventh lens 221, an eighth lens 222, a ninth lens 223, and a tenth lens 224 in sequence from the reduced side to the magnified side, wherein the seventh lens 221 has a positive refractive power, the eighth lens 222 has a positive refractive power, the ninth 223 lens has a positive refractive power, and the tenth 224 lens has a negative refractive power. In the embodiment of the invention, the first sub-lens group 210 may further include an eleventh lens 217 having a positive refractive power, and the eleventh lens 217 is disposed in the light path between the sixth lens 216 and the seventh lens 221.

In the embodiment of the invention, the third lens 213 and the fourth lens 214 form a double cemented lens 213a, and the fifth lens 215 and the sixth lens 216 form another double cemented lens 215a. In addition, each of the eighth lens 222 and the tenth lens 224 may be an aspheric lens. Furthermore, each of the first lens 211, the second lens 212, the third lens 213, the fourth lens 214, the fifth lens 215, the sixth lens 216, the eleventh lens 217, the seventh lens 221, and the ninth lens 223 may be a spherical lens. Lens 100 may further include an aperture stop 120 disposed between the eleventh lens 217 and the seventh lens 221.

More specifically, the first lens 211 for example may be a biconvex lens, the second lens 212 may be a biconvex lens, the third lens 213 may be a convex-concave lens having a convex surface facing the reduced side, the fourth lens 214 may be a concave-convex lens having a convex surface facing the reduced side, the fifth lens 215 may be a biconcave lens, the sixth lens 216 may be a concave-convex lens having a convex surface facing the reduced side, the eleventh lens 217 may be a biconvex lens, the seventh lens 221 may be a biconvex lens, the eighth lens 222 may be a concave-convex lens having a concave surface facing the reduced side, the ninth lens 223 may be a biconvex lens, and the tenth lens 224 may be a biconcave lens. The concave reflective mirror 110 may be a free form reflective mirror, for example. In the specification of the invention, the free form reflective mirror is a reflective mirror with a reflective surface configured as a free form surface, wherein the free form surface may be a curved surface describable by any mathematical expression.

Figure 2:
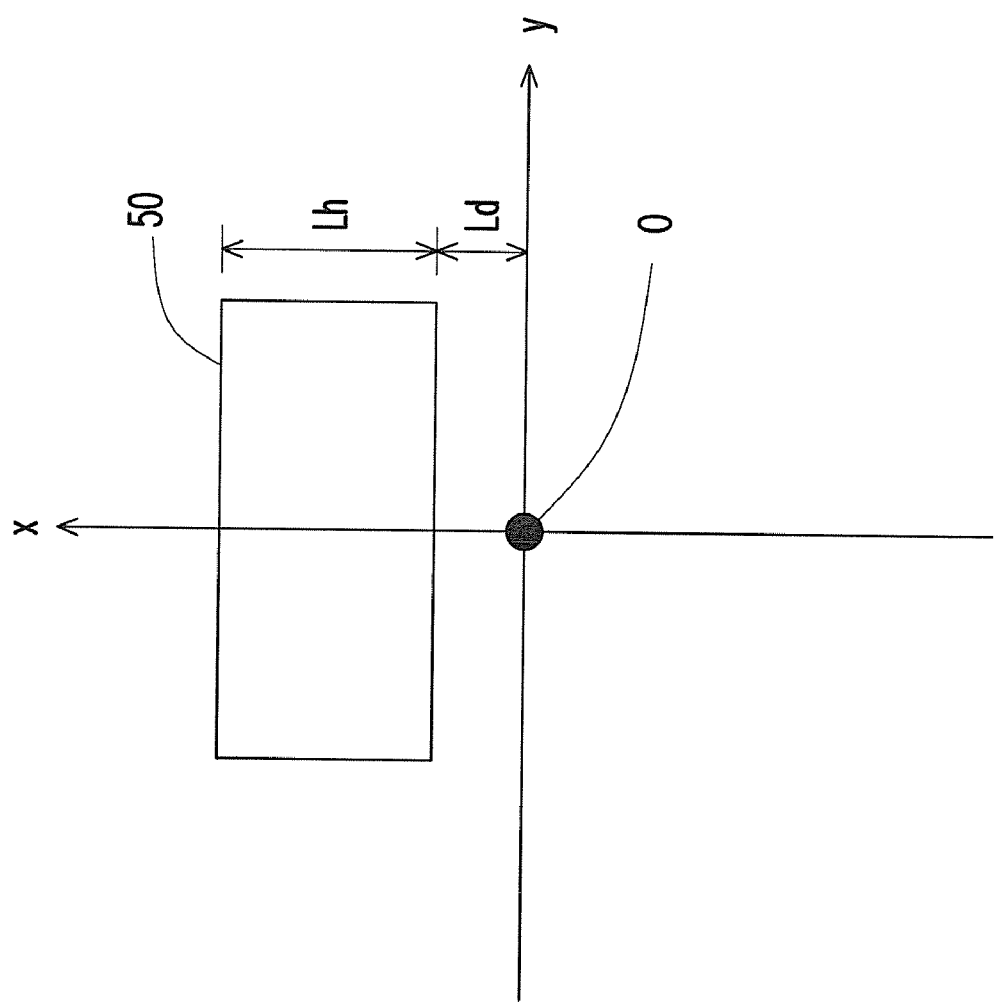
FIG. 2 is a schematic diagram illustrating an offset of a first image plane with respect to the optical axis.

Referring to FIGS. 1A, 1B, and 2, in the lens 100 according to the embodiment of the invention, the offset of the first image plane 50 with respect to the optical axis O is greater than 100%. The offset of the first image plane may be defined as:

$$\text{Offset} \equiv \frac{Lh + Ld}{Lh} \times 100\%$$

where Lh is a width of the image plane 50 along the offset direction, and Ld is a distance between a side near optical axis O of image plane 50 and the optical axis O. When the optical axis O and the first image plane 50 do not intersect each other, Ld is a positive value. When the optical axis O and a periphery of the first image plane 50 intersect each other, Ld is zero. Ld is a negative value when the optical axis O passes through a region within the periphery of the first image plane 50.

The throw ratio of the lens 100 is less than 0.3. The throw ratio for the lens 100 is defined as M/W, where M is a distance along the z-axis between an apex of the concave reflective mirror 110 and the screen 60 (depicted in FIG. 1A), and W is a horizontal length of the image projected by the lens 100.

Referring to FIGS. 1A, 1B, 3A, and 3B, the first image plane 50 includes an image point A, an image point B, an image point C, an image point D, an image point E, an image point F, an image point G, an image point H, and an image point I. Additionally, the first image plane 50 includes a first side E1, a second side E2 opposite to the first side E1, a third side E3 connected with the first side E1 and the second side E2, and a fourth side E4 opposite to the third side E3, wherein the fourth side E4 is connected with the first side E1 and the second side E2. The x-axis is parallel to the third side E3 and the fourth side E4, and the y-axis is parallel to the first side E1 and the second side E2. The image point A is disposed on an apex connecting the first side E1 and the third side E3, the image point C is disposed on an apex connecting the first side E1 and the fourth side E4, the image point G is disposed on an apex connecting the third side E3 and the second side E2, the image point I is disposed on an apex connecting the fourth side E4 and the second side E2, the image point B is disposed on a midpoint between the image point A and the image point C, the image point D is disposed on a midpoint between the image point A and the image point G, the image point F is disposed on a midpoint between the image point C and the image point I, the image point H is disposed on a midpoint between the image point G and the image point I, the image point E is disposed on a midpoint between the image point B and the image point H, and the image point E is also disposed on a midpoint between the image point D and the image point F. A reference plane P (depicted in FIGS. 1A and 3B) is disposed on a midpoint of a distance between the lens group 200 and the concave reflective mirror 110. In other words, in the embodiment of the invention, the distance on the optical axis O between the reference plane P and the tenth lens 224 is equal to the distance on the optical axis O between the reference plane P and the concave reflective mirror 110. Moreover, the reference plane P is perpendicular to the optical axis O. A center ray T between a plurality of marginal rays emitted from each of the image points A, B, C, D, E, F, G, H, and I intersects the reference plane P. The center rays T respectively emitted from each of the image points A, B, C, D, E, F, G, H, and I are adapted to respectively intersect the reference plane P at a reference point a, a reference point b, a reference point c, a reference point d, a reference point e, a reference point f, a reference point g, a reference point h, and a reference point i.

In the embodiment of the invention, each of the center rays T may be a chief ray passing through the lens 100, and the chief ray is a light ray passing through a geometric center of the aperture stop 120. When the lens 100 is a telecentric lens, the transmission direction of the center ray T is approximately parallel to the optical axis O near the first image plane 50.

Figure 3A:
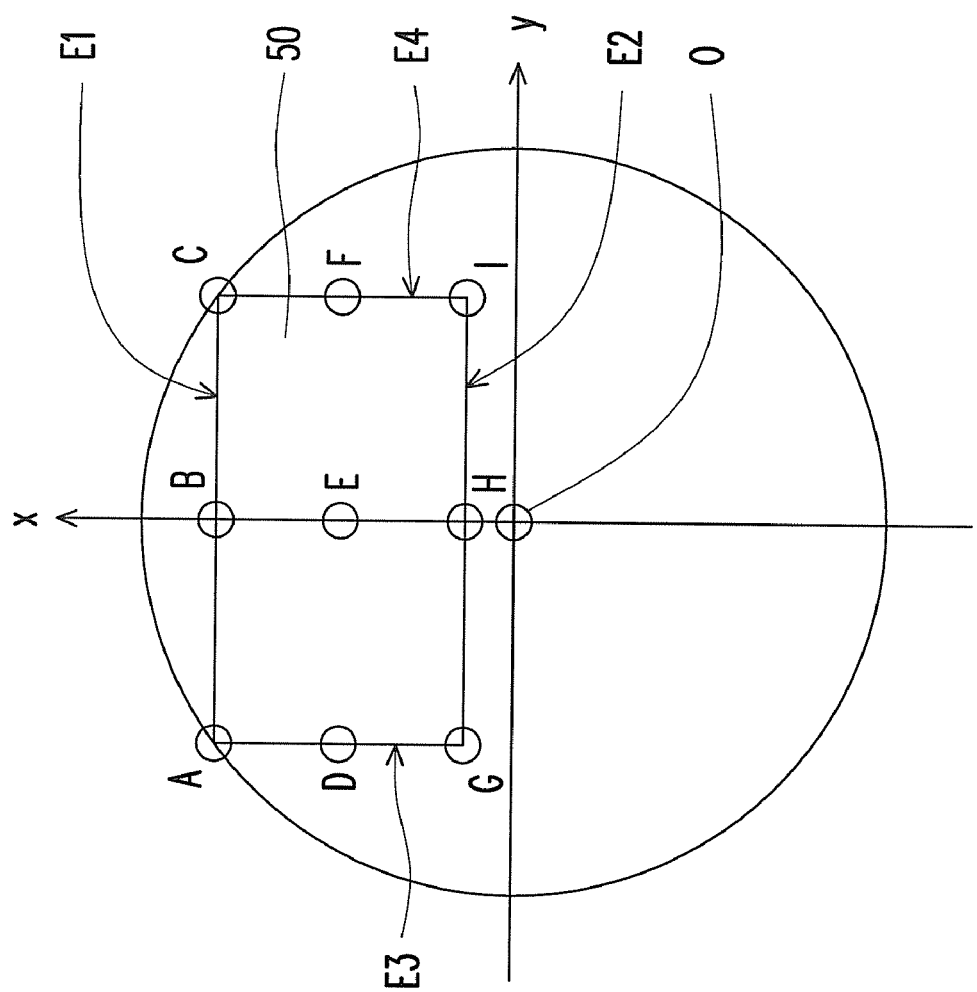
FIG. 3A is a schematic diagram of the first image plane in the lens depicted in FIG. 1A.
Figure 3B:
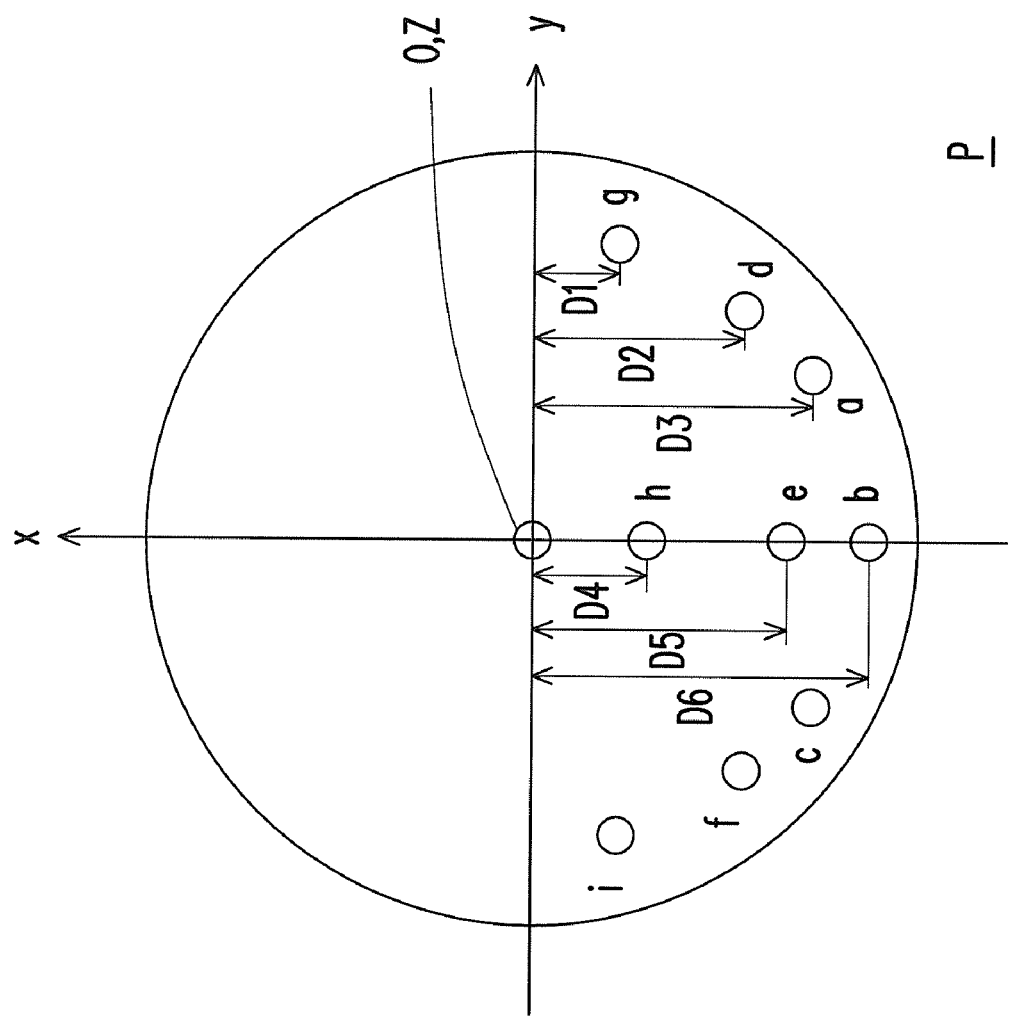
FIG. 3B is a schematic diagram of a reference plane in the lens depicted in FIG. 1A.

As shown in FIG. 3B, the distances respectively kept by the reference points g, d, a, h, e, and b from an y-z plane are respectively D1, D2, D3, D4, D5, and D6, wherein $1<D4/D1<1.5$, $1<D5/D2<1.5$, and $1<D6/D3<1.5$. In the embodiment of the invention, the reference point i and the reference point g are mirror images opposite to each other across an x-z plane, the reference point f and the reference point d are mirror images opposite to each other across the x-z plane, and the reference point c and the reference point a are mirror images opposite to each other across the x-z plane. An x-y plane is a plane formed by the x-axis and the y-axis, whereas the x-z plane is a plane formed by the x-axis and the z-axis. Moreover, in the embodiment of the invention, the image points B, E, and H may be disposed on the x-z plane, and the reference points b, e, and h may be disposed on the x-z plane.

The lens 100 according to the embodiment of the invention fits the aforementioned relation (i.e. $1<D4/D1<1.5$, $1<D5/D2<1.5$, and $1<D6/D3<1.5$), and has a smaller throw ratio (i.e. less than 0.3), and such that the lens 100 may project a substantially larger image within a substantially shorter distance, while the projected images have good optical image quality.

An embodiment of the lens 100 in the invention is described below. However, the invention is not limited to the data listed in Tables 1, 2, and 3. It should be known to those ordinarily skilled in the art that various modifications and variations may be made to the parameters or settings of the invention without departing from the scope or spirit of the invention.

TABLE 1

| Surface | Curvature (mm$^{-1}$) | Distance (mm) | Index of refraction | Dispersion Value | Notes |
|---|---|---|---|---|---|
| S1 | 0 | 0.483 | | | First Image Plane |
| S2 | 0 | 3 | 1.487489 | 70.44113 | Cover Glass |
| S3 | 0 | 2 | | | |
| S4 | 0 | 26 | 1.51633 | 64.14202 | Total Internal Reflection Prism |
| S5 | 0 | 4.115 | | | |
| S6 | 6.05E-03 | 6.356 | 1.48749 | 70.23625 | First Lens |
| S7 | -2.93E-02 | 0.065 | | | |
| S8 | 2.35E-02 | 4.337 | 1.48749 | 70.23625 | Second Lens |
| S9 | -4.17E-03 | 0.07 | | | |
| S10 | 4.61E-02 | 3.094 | 1.800999 | 34.9674 | Third Lens |
| S11 | 7.50E-02 | 6.195 | 1.48749 | 70.23625 | Fourth Lens |
| S12 | 9.64E-03 | 2.589 | | | |
| S13 | -3.44E-02 | 5.403 | 1.800999 | 34.9674 | Fifth Lens |
| S14 | 3.87E-02 | 2.552 | 1.48749 | 70.23625 | Sixth Lens |
| S15 | 6.85E-03 | 13.502 | | | |
| S26 | 2.58E-04 | 3.986 | 1.800999 | 34.9674 | Eleventh Lens |
| S27 | -4.60E-03 | 0.078 | | | |
| S16 | 0 | 0.073 | | | Aperture Stop |
| S17 | 1.47E-03 | 4.156 | 1.568832 | 56.3639 | Seventh Lens |
| S18 | -3.31E-02 | 48.862 | | | |

TABLE 1-continued

| Surface | Curvature (mm⁻¹) | Distance (mm) | Index of refraction | Dispersion Value | Notes |
|---|---|---|---|---|---|
| S19 | −1.28E−02 | 10.209 | 1.525279 | 55.95076 | Eighth Lens |
| S20 | −1.72E−02 | 63.781 | | | |
| S21 | 1.17E−02 | 20.134 | 1.58913 | 61.13502 | Ninth Lens |
| S22 | −4.39E−03 | 1.655 | | | |
| S23 | −2.88E−03 | 20.012 | 1.525279 | 55.95076 | Tenth Lens |
| S24 | 5.13E−02 | 248.625 | | | |
| S25 | −1.72E−02 | −200 | | | Concave Reflective Mirror |

In Table 1, the distance is a straight line distance between two adjacent surfaces on the optical axis. For example, the distance for a surface S1 is a straight line distance between the surface S1 and a surface S2 on the optical axis O. The thickness, index of refraction, and Abbe number corresponding to each of the lenses listed in the "Notes" column may be found in the corresponding values for the distance, index of refraction, and Abbe number from each row. Additionally, in Table 1, the surface S1 is the first image plane 50. The surface S2 and a surface S3 are two surfaces of a cover glass 70 used for protecting the light valve. A surface S4 and a surface S5 are two surfaces of a total internal reflection prism 80. A surface S6 and a surface S7 are two surfaces of the first lens 211, whereas a surface S8 and a surface S9 are two surfaces of the second lens 212. A surface S10 is a surface of the third lens 213 facing the reduced side, a surface S11 is a surface connecting the third lens 213 and the fourth lens 214, and a surface S12 is a surface of the fourth lens 214 facing the magnified side. A surface S13 is a surface of the fifth lens 215 facing the reduced side, a surface S14 is a surface connecting the fifth lens 215 and the sixth lens 216, and a surface S15 is a surface of the sixth lens 216 facing the magnified side. A surface S26 and a surface S27 are two surfaces of the eleventh lens 217. A surface S16 is a surface of the aperture stop 120. A surface S17 and a surface S18 are two surfaces of the seventh lens 221, whereas a surface S19 and a surface S20 are two surfaces of the eighth lens 222. A surface S21 and a surface S22 are two surfaces of the ninth lens 223, whereas a surface S23 and a surface S24 are two surfaces of the tenth lens 224. A surface S25 is a reflective surface of the concave reflective mirror 110, and the distance listed in the surface S25 row of Table 1 is the distance between the concave reflective mirror 110 and the image projected.

The radius of curvature, the distance, and other parameters are shown in Table 1, so they are not further described herein.

The above-described surfaces S19, S20, S23, and S24 are even-ordered polynomial aspheric surfaces that may be represented by the following equation:

$$Z = \frac{cr^2}{1 + \sqrt{1-(1+k)c^2r^2}} + A_2 r^2 + A_4 r^4 + A_6 r^6 + A_8 r^8 + A_{10} r^{10} + A_{12} r^{12} + \ldots$$

In the equation, Z is the sag along the direction of the optical axis O, c is the reciprocal of the radius of the osculating sphere, and is also the reciprocal of the radius of curvature near the optical axis O (e.g., the radii of curvatures for surfaces S19, S20, S23, and S24 listed in Table 1). k is the conic constant, r is the height of the aspheric surface, where the height is defined as the distance from the center of the lens to the edge of the lens. A2, A4, A6, A8, A10, A12 . . . are a plurality of aspheric coefficients, and the coefficient A2 is zero according to the embodiment of the invention. Table 2 lists the parameter values for surfaces S19, S20, S23, and S24.

TABLE 2

| Aspheric Surface Parameter | Conic Constant k | Coefficient A₄ | Coefficient A₆ | Coefficient A₈ |
|---|---|---|---|---|
| S19 | 10.048 | 6.39E−06 | −4.58E−09 | −4.02E−12 |
| S20 | −14.729 | −2.02E−06 | 1.19E−08 | −2.89E−11 |
| S23 | −29.29 | −2.47E−08 | −8.05E−10 | 3.48E−13 |
| S24 | −2.059 | −2.89E−06 | 1.40E−09 | −8.93E−13 |

| Aspheric Surface Parameter | Coefficient A₁₀ | Coefficient A₁₂ |
|---|---|---|
| S19 | −1.66E−14 | 0 |
| S20 | 7.79E−15 | 0 |
| S23 | −1.29E−16 | 1.49E−20 |
| S24 | 2.76E−16 | −3.37E−20 |

The above-described surface S25 is an even-ordered polynomial free form surface describable by the following equation:

$$Z = \frac{c(X^2+Y^2)}{1+\sqrt{1-(1+k)c^2(X^2+Y^2)}} + A_{2,0}X^2 + A_{0,2}Y^2 + A_{4,0}X^4 + $$
$$A_{2,2}X^2Y^2 + A_{0,4}Y^4 + A_{6,0}X^6 + A_{4,2}X^4Y^2 + A_{2,4}X^2Y^4 + A_{0,6}Y^6 + $$
$$A_{8,0}X^8 + A_{6,2}X^6Y^2 + A_{4,4}X^4Y^4 + A_{2,6}X^2Y^6 + A_{0,8}Y^8 + A_{10,0}X^{10} + $$
$$A_{8,2}X^8Y^2 + A_{6,4}X^6Y^4 + A_{4,6}X^4Y^6 + A_{2,8}X^2Y^8 + A_{0,10}Y^{10} + $$
$$A_{12,0}X^{12} + A_{10,2}X^{10}Y^2 + A_{8,4}X^8Y^4 + A_{6,6}X^6Y^6 + A_{4,8}X^4Y^8 + $$
$$A_{2,10}X^2Y^{10} + A_{0,12}Y^{12} + A_{14,0}X^{14} + A_{12,2}X^{12}Y^2 + A_{10,4}X^{10}Y^4 + $$
$$A_{8,6}X^8Y^6 + A_{6,8}X^6Y^8 + A_{4,10}X^4Y^{10} + A_{2,12}X^2Y^{12} + A_{0,14}Y^{14} + $$
$$A_{16,0}X^{16} + A_{14,2}X^{14}Y^2 + A_{12,4}X^{12}Y^4 + A_{10,6}X^{10}Y^6 + A_{8,8}X^8Y^8 + $$
$$A_{6,10}X^6Y^{10} + A_{4,12}X^4Y^{12} + A_{2,14}X^2Y^{14} + A_{0,16}Y^{16} + \ldots$$

where Z is the sag along the direction of the optical axis O, c is the reciprocal of the radius of the osculating sphere, and is also the reciprocal of the radius of curvature near the optical axis O (e.g. the radius of curvature for surface S25 listed in Table 1). k is the conic constant, X is the height of the free form surface along the x direction, Y is the height of the free form surface along the y direction, and is also the height from the center of the lens to the edge of the lens along the y direction, and $A_{2,0}$, $A_{0,2}$, $A_{4,0}$, $A_{2,2}$, $A_{0,4}$, $A_{6,0}$, $A_{4,2}$, $A_{2,4}$, $A_{0,6}$, $A_{8,0}$, $A_{6,2}$, $A_{4,4}$, $A_{2,6}$, $A_{0,8}$, $A_{10,0}$, $A_{8,2}$, $A_{6,4}$, $A_{4,6}$, $A_{2,8}$, $A_{0,10}$, $A_{12,0}$, $A_{10,2}$, $A_{8,4}$, $A_{6,6}$, $A_{4,8}$, $A_{2,10}$, $A_{0,12}$, $A_{14,0}$, $A_{12,2}$, $A_{10,4}$, $A_{8,6}$, $A_{6,8}$, $A_{4,10}$, $A_{2,12}$, $A_{0,14}$, $A_{16,0}$, $A_{14,2}$, $A_{12,4}$, $A_{10,6}$, $A_{8,8}$, $A_{6,10}$, $A_{4,12}$, $A_{2,14}$, $A_{0,16}$ . . . are free form coefficients. In the embodiment of the invention, $A_{2,0}$ and $A_{0,2}$ are zero. Table 3 lists the parameter values of surface S25.

TABLE 3

| | Free Form Parameter | | | |
|---|---|---|---|---|
| | Conic constant k | Coefficient A₄,₀ | Coefficient A₂,₂ | Coefficient A₀,₄ |
| S21 | −2.267634 | −3.171E−07 | −6.342E−07 | −3.171E−07 |

| | Free Form Parameter | | | |
|---|---|---|---|---|
| | Coefficient A₆,₀ | Coefficient A₄,₂ | Coefficient A₂,₄ | Coefficient A₀,₆ |
| S21 | 3.179E−11 | 9.538E−11 | 9.538E−11 | 3.179E−11 |

TABLE 3-continued

| | Free Form Parameter | | | |
|---|---|---|---|---|
| | Coefficient $A_{8.0}$ | Coefficient $A_{6.2}$ | Coefficient $A_{4.4}$ | Coefficient $A_{2.6}$ |
| S21 | −3.12E−15 | −1.25E−14 | −1.87E−14 | −1.250E−14 |
| | Free Form Parameter | | | |
| | Coefficient $A_{0.8}$ | Coefficient $A_{10.0}$ | Coefficient $A_{8.2}$ | Coefficient $A_{6.4}$ |
| S21 | −3.124E−15 | 2.077E−19 | 1.039E−18 | 2.077E−18 |
| | Free Form Parameter | | | |
| | Coefficient $A_{4.6}$ | Coefficient $A_{2.8}$ | Coefficient $A_{0.10}$ | Coefficient $A_{12.0}$ |
| S21 | 2.077E−18 | 1.039E−18 | 2.077E−19 | −8.686E−24 |
| | Free Form Parameter | | | |
| | Coefficient $A_{10.2}$ | Coefficient $A_{8.4}$ | Coefficient $A_{6.6}$ | Coefficient $A_{4.8}$ |
| S21 | −5.211E−23 | −1.303E−22 | −1.737E−22 | −1.303E−22 |
| | Free Form Parameter | | | |
| | Coefficient $A_{2.10}$ | Coefficient $A_{0.12}$ | Coefficient $A_{14.0}$ | Coefficient $A_{12.2}$ |
| S21 | −5.211E−23 | −8.686E−24 | 1.819E−28 | 1.274E−27 |
| | Free Form Parameter | | | |
| | Coefficient $A_{10.4}$ | Coefficient $A_{8.6}$ | Coefficient $A_{6.8}$ | Coefficient $A_{4.10}$ |
| S21 | 3.821E−27 | 6.368E−27 | 6.368E−27 | 3.821E−27 |
| | Free Form Parameter | | | |
| | Coefficient $A_{2.12}$ | Coefficient $A_{0.14}$ | Coefficient $A_{16.0}$ | Coefficient $A_{14.2}$ |
| S21 | 1.274E−27 | 1.819E−28 | −1.066E−33 | −8.529E−33 |
| | Free Form Parameter | | | |
| | Coefficient $A_{12.4}$ | Coefficient $A_{10.6}$ | Coefficient $A_{8.8}$ | Coefficient $A_{6.10}$ |
| S21 | −2.985E−32 | −5.970E−32 | −7.463E−32 | −5.970E−32 |
| | Free Form Parameter | | | |
| | Coefficient $A_{4.12}$ | Coefficient $A_{2.14}$ | Coefficient $A_{0.16}$ | |
| S21 | −2.985E−32 | −8.529E−33 | −1.066E−33 | |

In the lens 100 according to the embodiment of the invention, an exemplary first image plane 50 may be a 0.65 inch first image plane 50 having a 16:9 length-to-width ratio, a 1080 P resolution, a throw ratio of 0.15, an offset such as 120%, and an image size such as 60 inches. Moreover, in the lens 100 according to the embodiment of the invention, a distance D1 may be 13.39 mm, a distance D2 may be 41.74 mm, a distance D3 may be 56.38 mm, a distance D4 can be 16.24 mm, a distance D5 may be 51.05 mm, a distance D6 may be 68.67 mm, D4/D1 maybe 1.21, D5/D2 may be 1.22, and D6/D3 may be 1.21.

Figure 4:
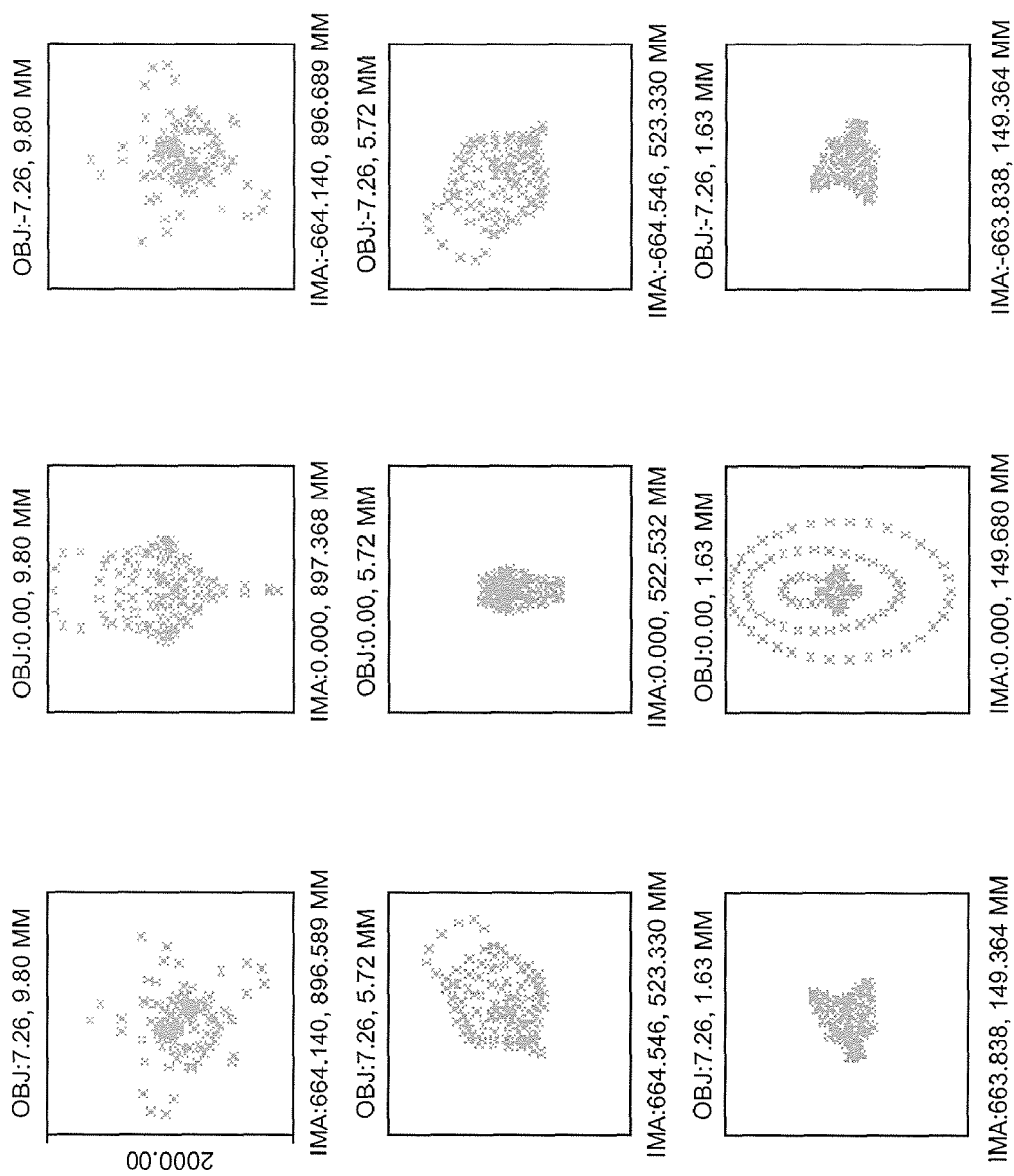
FIG. 4 is a diagram illustrating the simulated data of the imaging optics in the lens 100 depicted in FIG. 1A.

Referring to FIG. 4, in FIG. 4 green light (i.e. 550 nm wavelength) is used to simulate a plurality of spot diagrams, where the spot diagrams illustrate the size of light spots on the screen 60 for various fields of views, and the light spots are projected from different points on the first image plane 50. The shapes illustrated in FIG. 4 are all within a standard range, such that validating the substantially good optical image quality of the lens 100 according to the embodiment of the invention.

Figure 5A:
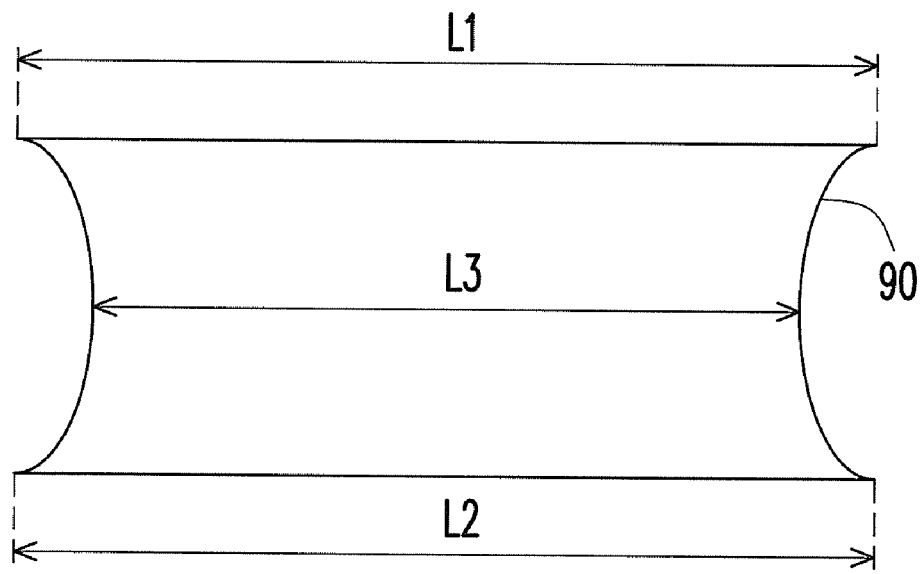
FIGS. 5A and 5B are schematic diagrams illustrating a plurality of TV distortions of the images.
Figure 5B:
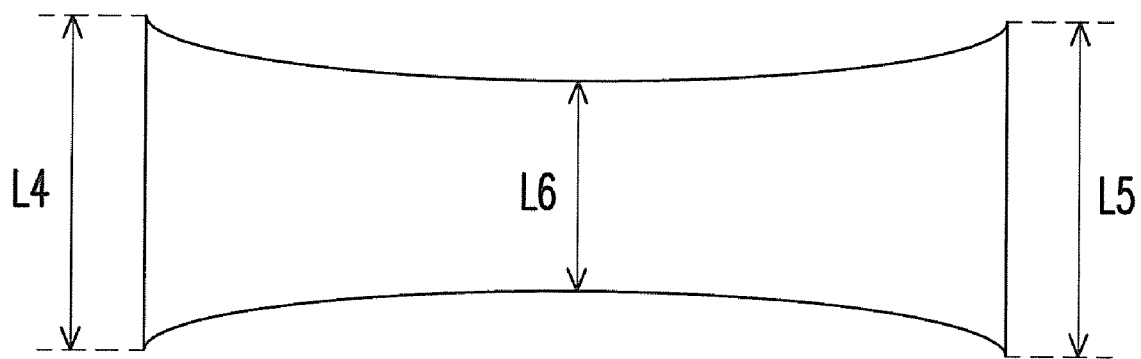

Referring to FIG. 5A, an upper TV distortion of the image 90 is defined as (L1−L3)/L3, and a lower TV distortion of the image 90 is defined as (L2−L3)/L3. Referring to FIG. 5B, a vertical TV distortion of the image 90 is defined as [(L4+L5)−2*L6]/(2*L6). Referring to FIGS. 1A and 1B, for the lens 100 according to the embodiment of the invention, the upper TV distortion of the image projected by the lens 100 may be 0.06%, the lower TV distortion may be 0.1%, and the vertical TV distortion may be 0.06%, for example. Accordingly, lens 100 may have substantially good optical image quality.

Figure 6A:
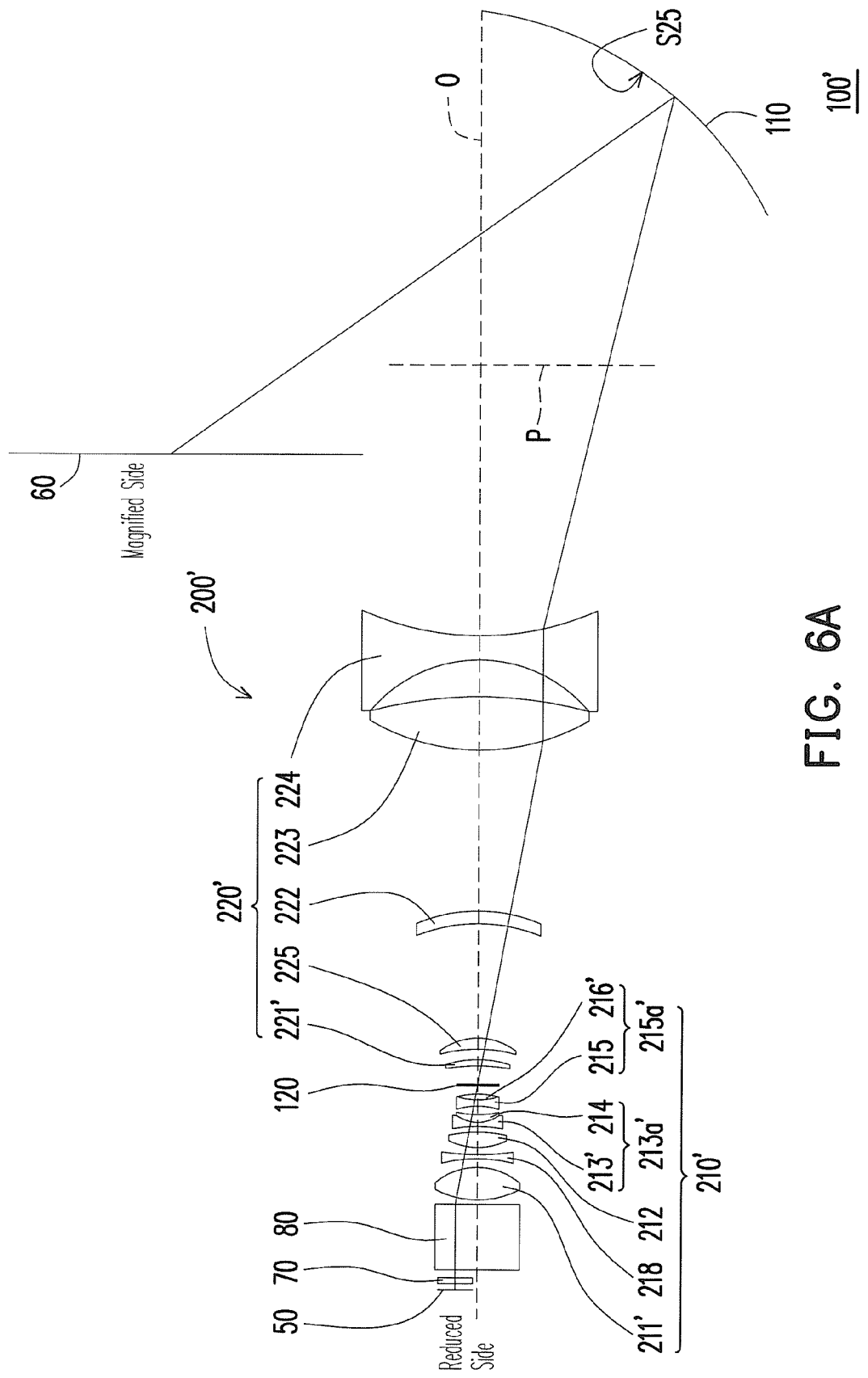
FIG. 6A is a schematic diagram illustrating the structure of a lens in accordance with another embodiment of the invention.
Figure 6B:
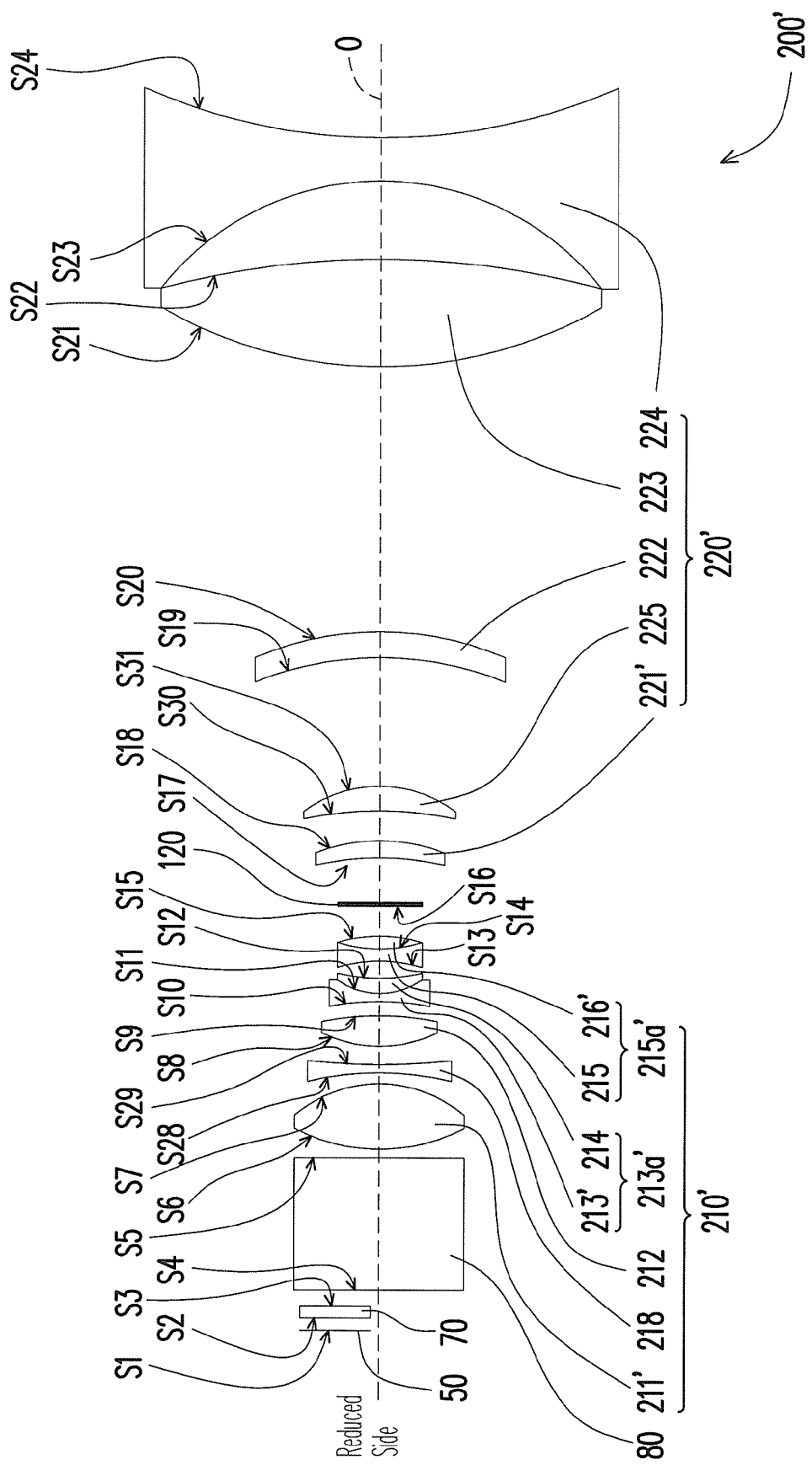
FIG. 6B is a schematic diagram illustrating the structure of the lens group in the lens depicted in FIG. 6A.

Referring to FIGS. 6A and 6B, a lens 100' according to the embodiment of the invention is similar to the above-described lens 100 (depicted in FIG. 1A), and the differences between the two lenses are described below. In the lens group 200' of the lens 100', a first sub-lens group 210' further includes a twelfth lens 218 and a thirteenth lens 225. A twelfth lens 218 is disposed in the light path between the first lens 211' and the second lens 212, the thirteenth lens 225 is disposed in the light path between the seventh lens 221' and the eighth lens 222, the twelfth lens 218 has a negative refractive power, and the thirteenth lens 225 has a positive refractive power. In the embodiment of the invention, each of the twelfth lens 218 and the thirteenth lens 225 may be a spherical lens, for example. Moreover, the first lens 211' may be an aspheric lens. Furthermore, in the embodiment of the invention, the aperture stop 120 is disposed between the sixth lens 216' and the seventh lens 221'.

In one embodiment of the invention, the first lens 211' may be a biconvex lens, the twelfth lens 218 may be a biconcave lens, a third lens 213' may be a biconcave lens, and the third lens 213' and the fourth lens 214 may form a double cemented lens 213a'. A sixth lens 216' may be a biconvex lens, and the fifth lens 215 and the sixth lens 216' may form another double cemented lens 125a'. The seventh lens 221' may be a concave-convex lens having a concave surface facing the reduced side, and the thirteenth lens 225 is a concave-convex lens having a concave surface facing the reduced side. The concave reflective mirror 110 may be an aspheric reflective mirror, for example. The lens 100' according to the embodiment of the invention has similar advantages as the above-described lens 100 (depicted in FIG. 1A), so no further description is provided herein.

An embodiment of the lens 100' in the invention is described below. However, the invention is not limited to the data listed below in Tables 4 and 5. It should be known to those ordinarily skilled in the art that various modifications and variations may be made to the parameters or settings of the invention without departing from the scope or spirit of the invention.

TABLE 4

| Surface | Curvature ($mm^{-1}$) | Distance (mm) | Index of Refraction | Dispersion Value | Notes |
|---|---|---|---|---|---|
| S1 | 0 | 0.483 | | | First Image Plane |
| S2 | 0 | 3 | 1.487489 | 70.441128 | Cover Glass |
| S3 | 0 | 2 | | | |
| S4 | 0 | 26 | 1.51633 | 64.142022 | Total Internal Reflection Prism |
| S5 | 0 | 2 | | | |
| S6 | 3.36E−02 | 11.4 | 1.491786 | 57.327362 | First Lens |
| S7 | −4.16E−02 | 3.94 | | | |
| S28 | −1.04E−02 | 1.2 | 1.48749 | 70.236249 | Twelfth Lens |

TABLE 4-continued

| Surface | Curvature (mm$^{-1}$) | Distance (mm) | Index of Refraction | Dispersion Value | Notes |
|---|---|---|---|---|---|
| S29 | 2.70E−03 | 6.18 | | | |
| S8 | 3.11E−02 | 4.48 | 1.48749 | 70.236249 | Second Lens |
| S9 | −4.44E−03 | 0.718 | | | |
| S10 | −6.35E−03 | 1.2 | 1.800999 | 34.967411 | Third Lens |
| S11 | 6.44E−02 | 3.79 | 1.48749 | 70.236249 | Fourth Lens |
| S12 | 1.08E−02 | 1.26 | | | |
| S13 | −3.78E−03 | 1.2 | 1.800999 | 34.967411 | Fifth Lens |
| S14 | 3.42E−02 | 4.01 | 1.48749 | 70.236249 | Sixth Lens |
| S15 | −6.12E−03 | 4.3 | | | |
| S16 | 0 | 6.99 | | | Aperture Stop |
| S17 | −3.23E−03 | 2.04 | 1.800999 | 34.967411 | Seventh Lens |
| S18 | −1.54E−02 | 4.68 | | | |
| S30 | −1.93E−02 | 3.97 | 1.568832 | 56.363898 | Thirteenth Lens |
| S31 | −4.07E−02 | 44.9 | | | |
| S19 | −1.95E−02 | 4.22 | 1.491786 | 57.327362 | Eighth Lens |
| S20 | −2.02E−02 | 64.3 | | | |
| S21 | 1.27E−02 | 20.1 | 1.58913 | 61.135024 | Ninth Lens |
| S22 | −6.33E−03 | 14.5 | | | |
| S23 | −3.49E−02 | 9.75 | 1.491786 | 57.327362 | Tenth Lens |
| S24 | 1.60E−02 | 243 | | | |
| S25 | −1.31E−02 | −330 | | | Concave Reflective Mirror |

In Table 4, Surfaces S1-S5, S8, S9, S12, S13, S16, S19-S25 is the same as the surfaces S1-S5, S8, S9, S12, S13, S16, S19-S25 in Table 1, so no further description is provided herein thereof. Moreover, surfaces S6 and S7 are two surfaces of the first lens 211', and surfaces S28 and S29 are two surfaces of the twelfth lens 218. The surface S10 is a surface of the third lens 213' facing the reduced side, and the surface S11 is a surface connecting the third lens 213' and the fourth lens 214. The surface S14 is a surface connecting the fifth lens 215 and the sixth lens 216', and the surface S15 is a surface of the sixth lens 216' facing the magnified side. Surfaces S17 and S18 are two surfaces of the seventh lens 221'.

The above-described surfaces S6, S7, S19, S20, S23, S24, and S25 are even-ordered polynomial aspheric surfaces. The coefficient $A_2$ is zero according to the embodiment of the invention. Table 5 lists the parameter values for surfaces S6, S7, S19, S20, S23, S24, and S25.

TABLE 5

| Aspheric Surface Parameter | Conic constant k | Coefficient $A_4$ | Coefficient $A_6$ | Coefficient $A_8$ |
|---|---|---|---|---|
| S6 | −3.14E+00 | −8.690E−06 | −1.111E−09 | 1.282E−11 |
| S7 | −2.25E+00 | −7.541E−06 | −1.376E−09 | 4.082E−12 |
| S19 | −3.37E−01 | 2.203E−06 | 1.169E−08 | −2.015E−11 |
| S20 | −1.04E+01 | −6.125E−06 | 2.520E−08 | −3.287E−11 |
| S23 | −3.01E+00 | 4.526E−07 | −6.617E−10 | −6.568E−15 |
| S24 | −3.53E+00 | −1.432E−06 | 8.287E−10 | −6.132E−13 |
| S25 | −2.80E+00 | −3.291E−07 | 3.353E−11 | −3.187E−15 |

| Aspheric Surface Parameter | Coefficient $A_{10}$ | Coefficient $A_{12}$ | Coefficient $A_{14}$ | Coefficient $A_{16}$ |
|---|---|---|---|---|
| S6 | −1.454E−14 | 0.000E+00 | 0.000E+00 | 0.000E+00 |
| S7 | −8.721E−15 | 0.000E+00 | 0.000E+00 | 0.000E+00 |
| S19 | 3.870E−15 | 0.000E+00 | 0.000E+00 | 0.000E+00 |
| S20 | 1.157E−14 | 0.000E+00 | 0.000E+00 | 0.000E+00 |
| S23 | 1.387E−16 | −3.122E−20 | 0.000E+00 | 0.000E+00 |
| S24 | 2.323E−16 | −3.109E−20 | 0.000E+00 | 0.000E+00 |
| S25 | 2.009E−19 | −7.888E−24 | 1.987E−28 | −3.741E−33 |

In the lens 100' according to the embodiment of the invention, an exemplary first image plane 50 may be a 0.65 inch first image plane 50 having a 16:9 length-to-width ratio, a 1080 P resolution, a throw ratio of 0.25, an offset such as 120%, and an image size such as 60 inches. Moreover, in the lens 100' according to the embodiment of the invention, the distance D1 may be 12.33 mm, the distance D2 may be 39.48 mm, the distance D3 may be 57.528 mm, the distance D4 may be 14.89 mm, the distance D5 may be 46.46 mm, the distance D6 may be 65.73 mm, D4/D1 may be 1.2, D5/D2 may be 1.17, and D6/D3 may be 1.14.

Referring to FIG. 7, in FIG. 7 green light (i.e. 550 nm wavelength) is used to simulate a plurality of spot diagrams, wherein the spot diagrams illustrate the size of light spots on the screen 60 for various fields of views, and the light spots are projected from different points on the first image plane 50. The shapes illustrated in FIG. 7 are all within the standard range, such that validating the substantially good optical image quality of the lens 100' according to the embodiment of the invention.

For the lens 100' according to the embodiment of the invention, the upper TV distortion of the image projected by the lens 100' may be 0.16%, the lower TV distortion may be 0.1%, and the vertical TV distortion may be 0.15%, for example. Accordingly, lens 100' may have substantially good optical image quality.

In light of the foregoing description, the lens according to embodiments of the invention fits the aforementioned relation (i.e. 1<D4/D1<1.5, 1<D5/D2<1.5, and 1<D6/D3<1.5), and has a smaller throw ratio (i.e. less than 0.3), such that the lens may project a substantially larger image within a substantially shorter distance, while the optical image quality of the projected images remain substantially good.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens adapted to image a first image plane at a reduced side onto a magnified side, the lens having an optical axis, and the lens comprising:
a lens group disposed in a light path between the reduced side and the magnified side; and
a concave reflective mirror disposed in the light path between the lens group and the magnified side;
wherein an offset of the first image plane with respect to the optical axis is greater than 100%, the offset is defined as $$\text{Offset} \equiv \frac{Lh + Ld}{Lh} \times 100\%,$$

where Lh is a width of the first image plane and Ld is a distance between a side of the first image plane closer to the optical axis and the optical axis; a throw ratio of the lens is less than 0.3; the first image plane has an image point A, an image point B, an image point C, an image point D, an image point E, an image point F, an image point G, an image point H, and an image point I; the first image plane has a first side, a second side opposite to the first side, a third side connected with the first side and the second side, and a fourth side opposite to the third side, wherein the fourth side is connected with the first side and the second side; the image point A is disposed on an apex connecting the first side and the third side; the image point C is disposed on an apex connecting the first side and the fourth side; the image point G is disposed on an apex connecting the third side and the second side; the image point I is disposed on an apex connecting the fourth side and the second side; the image point B is disposed on a midpoint between the image point A and the image point C; the image point D is disposed on a midpoint between the image point A and the image point G; the image point F is disposed on a midpoint between the image point C and the image point I; the image point H is disposed on a midpoint between the image point G and the image point I; the image point E is disposed on a midpoint between the image point B and the image point H; the image point E is disposed on a midpoint between the image point D and the image point F; a reference plane is disposed on a midpoint of a distance between the lens group and the concave reflective mirror, wherein the reference plane is perpendicular to the optical axis; a center ray between a plurality of marginal rays emitted from each of the image points A, B, C, D, E, F, G, H, and I is adapted to intersect the reference plane; the center rays respectively emitted from each of the image points A, B, C, D, E, F, G, H, and I respectively intersect the reference plane at a reference point a, a reference point b, a reference point c, a reference point d, a reference point e, a reference point f, a reference point g, a reference point h, and a reference point i; the lens is disposed in a space defined by a coordinate system constructed by a x-axis, a y-axis, and a z-axis; the optical axis and the z-axis overlap each other; the x-axis is parallel to the third side and the fourth side; the y-axis is parallel to the first side and the second side; the x, y, and z axes are perpendicular to each other; distances respectively kept by the reference points g, d, a, h, e, and b from an y-z plane are respectively D1, D2, D3, D4, D5, and D6, wherein 1<D4/D1<1.5, 1<D5/D2<1.5, and 1<D6/D3<1.5.

2. The lens as claimed in claim 1, wherein each of the center rays is a chief ray passing through the lens.

3. The lens as claimed in claim 1, wherein the reference point i and the reference point g are mirror images opposite to each other across an x-z plane, the reference point f and the reference point d are mirror images opposite to each other across the x-z plane, and the reference point c and the reference point a are mirror images opposite to each other across the x-z plane.

4. The lens as claimed in claim 1, wherein the image points B, E, and H are disposed on the x-z plane, and the reference points b, e, and h are disposed on the x-z plane.

5. The lens as claimed in claim 1, wherein the lens group comprises:
a first sub-lens group disposed in the light path between the reduced side and the concave reflective mirror, wherein the first sub-lens group comprises a first lens, a second lens, a third lens, a fourth lens, a fifth lens, and a sixth lens in sequence from the reduced side to the magnified side, the first lens has a positive refractive power, the second lens has a positive refractive power, the third lens has a negative refractive power, the fourth lens has a positive refractive power, the fifth lens has a negative refractive power, and the sixth lens has a positive refractive power; and
a second sub-lens group disposed in the light path between the first sub-lens group and the concave reflective mirror, wherein the second sub-lens group comprises a seventh lens, an eighth lens, a ninth lens, and a tenth lens in sequence from the reduced side to the magnified side, the seventh lens has a positive refractive power, the eighth lens has a positive refractive power, the ninth lens has a positive refractive power, and the tenth lens has a negative refractive power.

6. The lens as claimed in claim 5, wherein the third lens and the fourth lens form a double cemented lens, and the fifth lens and the sixth lens form another double cemented lens.

7. The lens as claimed in claim 5, wherein the first sub-lens group further comprises an eleventh lens having a positive refractive power, the eleventh lens is disposed in the light path between the sixth lens and the seventh lens, and each of the eighth lens and the tenth lens is an aspheric lens.

8. The lens as claimed in claim 7, wherein each of the first lens, the second lens, the third lens, the fourth lens, the fifth lens, the sixth lens, the eleventh lens, the seventh lens, and the ninth lens is a spherical lens.

9. The lens as claimed in claim 7, further comprising an aperture stop disposed between the eleventh lens and the seventh lens.

10. The lens as claimed in claim 7, wherein the first lens is a biconvex lens, the second lens is a biconvex lens, the third lens is a convex-concave lens having a convex surface facing the reduced side, the fourth lens is a concave-convex lens having a convex surface facing the reduced side, the fifth lens is a biconcave lens, the sixth lens is a concave-convex lens having a convex surface facing the reduced side, the eleventh lens is a biconvex lens, the seventh lens is a biconvex lens, the eighth lens is a concave-convex lens having a concave surface facing the reduced side, the ninth lens is a biconvex lens, and the tenth lens is a biconcave lens.

11. The lens as claimed in claim 5, wherein the first sub-lens group further comprises a twelfth lens having a negative refractive power and a thirteenth lens having a positive refractive power, wherein the twelfth lens is disposed in the light path between the first lens and the second lens, the thirteenth lens is disposed in the light path between the seventh lens and the eighth lens, and each of the first lens, the eighth lens, and the tenth lens is an aspheric lens.

12. The lens as claimed in claim 11, wherein each of the twelfth lens, the second lens, the third lens, the fourth lens, the fifth lens, the sixth lens, the seventh lens, the thirteenth lens, and the ninth lens is a spherical lens.

13. The lens as claimed in claim 11, further comprising an aperture stop disposed between the sixth lens and the seventh lens.

14. The lens as claimed in claim 11, wherein the first lens is a biconvex lens, the twelfth lens is a biconcave lens, the second lens is a biconvex lens, the third lens is a biconcave lens, the fourth lens is a concave-convex lens having a convex surface facing the reduced side, the fifth lens is a biconcave lens, the sixth lens is a biconvex lens, the seventh lens is a concave-convex lens having a concave surface facing the reduced side, the thirteenth lens is a concave-convex lens having a concave surface facing the reduced side, the eighth lens is a concave-convex lens having a concave surface facing the reduced side, the ninth lens is a biconvex lens, and the tenth lens is a biconcave lens.

15. The lens as claimed in claim 1, wherein the concave reflective mirror is a free form reflective mirror.

16. The lens as claimed in claim 1, wherein the concave reflective mirror is an aspheric reflective mirror.

* * * * *